(Model.)
C. STRAUB.
Reversing Gear for Steam Engines.
No. 237,925. Patented Feb. 15, 1881.
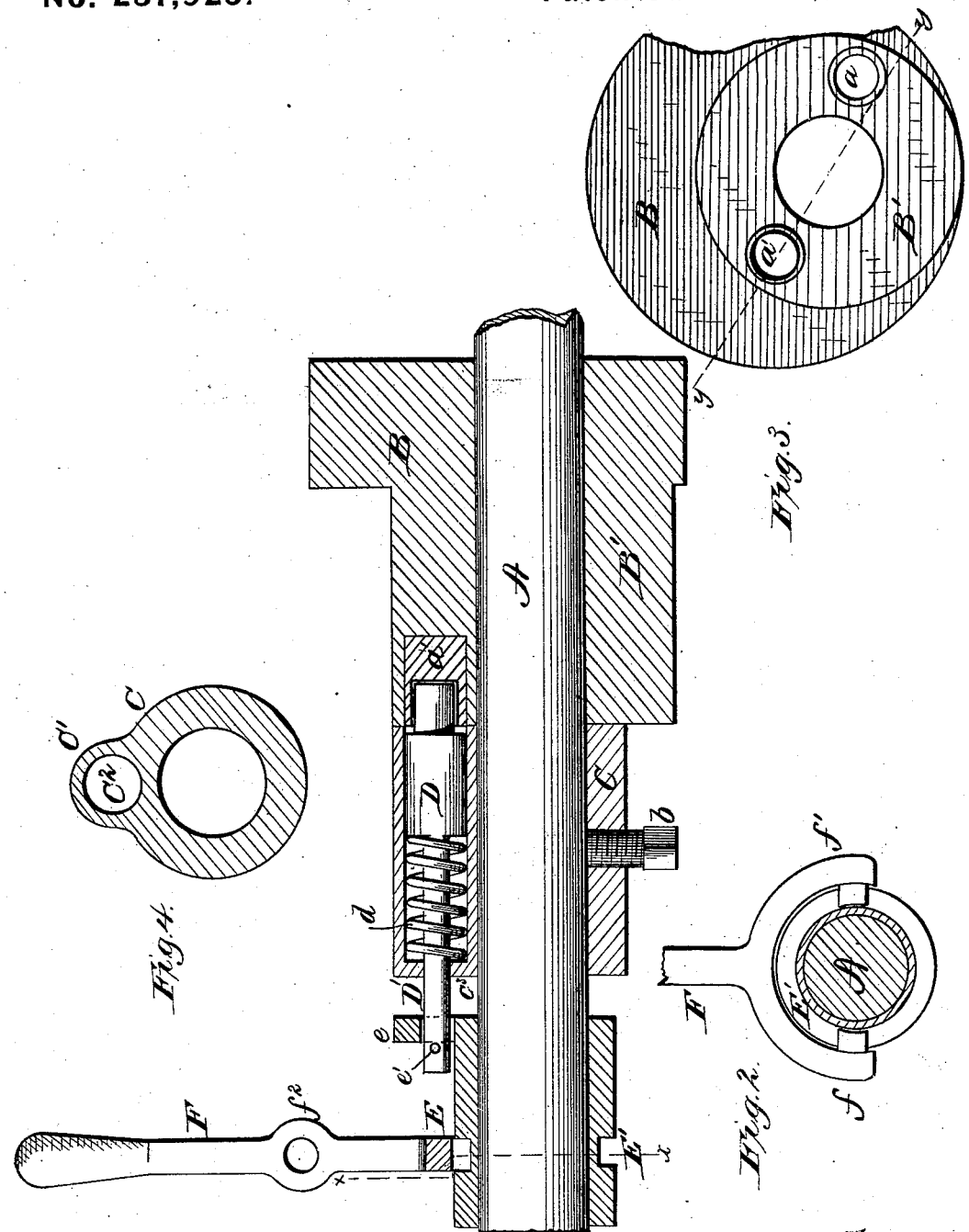

UNITED STATES PATENT OFFICE.

CONRAD STRAUB, OF MANSFIELD, OHIO, ASSIGNOR TO THE AULTMAN AND TAYLOR COMPANY, OF SAME PLACE.

REVERSING-GEAR FOR STEAM-ENGINES.

SPECIFICATION forming part of Letters Patent No. 237,925, dated February 15, 1881.

Application filed December 8, 1880. (Model.)

*To all whom it may concern:*

Be it known that I, CONRAD STRAUB, of Mansfield, county of Richland, State of Ohio, have invented certain new and useful Improvements in Reversing-Gear for Steam-Engines, of which the following is a full, clear, and exact description, reference being had to the accompanying drawings, making part of this specification, in which—

Figure 1 represents a section through the eccentric on the main or crank shaft of the engine and through the reversing gear or mechanism connected therewith. Fig. 2 is a section taken on the line $x\ x$, Fig. 1. Fig. 3 is a face or side view of the eccentric detached, showing the arrangement of sockets or thimbles therein; and Fig. 4 is a side elevation of the hub or collar on the main shaft which carries the sliding clutch-pin.

The invention relates to a novel means for reversing the engine or the direction of rotation of the main engine-shaft; and it consists in providing the eccentric, mounted loosely on said shaft, with sockets or thimbles, adapting it to be engaged with the shaft through the medium of a sliding pin or bolt moving in a hub or collar fixed to and rotating with the shaft, whereby said eccentric can be coupled to the shaft on either side for reversing the throw of the valve-rod relative to said shaft, and thereby reversing the direction of rotation of the shaft; also, in certain details of construction and arrangement of parts hereinafter fully described.

In the accompanying drawings, A represents the main engine or crank shaft, and B the eccentric for actuating the valve, mounted loosely thereon. One side of this eccentric has a hub or collar, B', formed upon it, in the outer face of which and upon opposite sides of the shaft A are formed sockets for the reception of two steel thimbles, $a\ a'$, (see Figs. 1 and 3,) or if preferred these sockets or thimbles may be formed in or applied directly to the eccentric.

On the shaft A, adjacent to the hub B', is secured a collar, C, held in place upon and secured to the shaft, so as to rotate with it, by one or more set-screws, $b$, or other equivalent fastening device. One side of the collar C is enlarged (see Fig. 4) at C', and has a cylindrical socket, $C^2$, formed in it for the reception of a sliding rod or pin, D. The end wall of this socket is perforated at $c^3$, and a reduced extension or shank, D', of the pin D passes through said perforation and is connected with a sliding collar, E, on the shaft A, as shown.

Behind the body D and surrounding the shank D' of the sliding pin within the socket $C^2$ is a spiral spring, $d$, the tension of which is exerted to force the pin outward, causing it to enter the thimble or socket in the adjacent side of the eccentric.

The collar E is mounted loosely on shaft A, adapting it to slide longitudinally on said shaft, but it rotates with the shaft, owing to its connection therewith, through the pin D and collar C. The end of the shank D' passes through a perforated lug or ear, $e$, on the collar E, and is held connected therewith by a pin, $e'$, or other suitable fastening device. The collar E has a groove at E' in its periphery, and the forks or arms $f\ f'$ of a lever, F, enter said groove, engaging the lever with the collar, but permitting the latter to rotate freely with the shaft. The lever is pivoted, at $f^2$, to any suitable stationary arm or support on the engine, the arrangement being such that the attendant, by operating said lever, can, through the connection of the sliding collar E with the pin D, overcome the tension of the spring $d$ and withdraw said pin from engagement with the eccentric, thereby releasing the latter from the shaft. Thus, supposing the eccentric to be coupled to its shaft through the pin D in collar C entering the socket or thimble $a$ in the eccentric, when said pin is withdrawn the shaft moves on, while the rotation of the eccentric, owing to its connection with the valve, is instantly stopped until the pin D comes opposite to and enters the socket or thimble $a'$, bringing the eccentric upon the opposite side of the shaft and reversing the relation of the valve thereto, and consequently reversing the engine or the direction of rotation of the engine-shaft, as will be readily understood. When the pin has been withdrawn from engagement with the eccentric the lever is released by the attendant and the pin is pressed, by the tension of its spring $d$, against the side of the eccentric until it reaches the opposite socket or thimble, when it is instantly forced into the same by the action of the spring again engaging the eccentric with its shaft in reversed relation thereto.

It will be apparent that modifications may be made in the form of the parts from that shown and described without departing from my invention.

Having described my invention, I claim—

1. The combination, with the main engine or crank shaft, of the fixed hub or collar, provided with the sliding pin or bolt, and the eccentric mounted loosely on said shaft and provided with the sockets or thimbles, substantially as and for the purpose described.

2. The combination, with the main engine or crank shaft, of the fixed hub or collar, with its sliding pin or bolt, the eccentric mounted loosely on said shaft and having the sockets or thimbles for the reception of said pin, and the spring and sliding collar for actuating said pin, arranged and operating substantially as described.

CONRAD STRAUB.

Witnesses:
HUNTINGTON BROWN,
J. E. BROWN.